US012778090B2

(12) United States Patent
Zhao et al.

(10) Patent No.: US 12,778,090 B2
(45) Date of Patent: Nov. 3, 2026

(54) INTELLIGENT FEEDING METHOD AND SYSTEM FOR FISH IN RECIRCULATING AQUACULTURE SYSTEM BASED ON REPEATED GAMES

(71) Applicant: Zhejiang University, Hangzhou City (CN)

(72) Inventors: Jian Zhao, Hangzhou City (CN); Ruiji Mahe, Hangzhou City (CN); Yanfeng Zhang, Hangzhou City (CN); Zhenlong Sun, Hangzhou City (CN); Yanci Wen, Hangzhou City (CN); Zequn Peng, Hangzhou City (CN); Zhangying Ye, Hangzhou City (CN); Songming Zhu, Hangzhou City (CN)

(73) Assignee: Zhejiang University, Hangzhou City (CN)

( * ) Notice: Subject to any disclaimer, the term of this patent is extended or adjusted under 35 U.S.C. 154(b) by 218 days.

(21) Appl. No.: 18/815,316

(22) Filed: Aug. 26, 2024

(65) Prior Publication Data

US 2026/0053120 A1 Feb. 26, 2026

(51) Int. Cl.
*A01K 61/95* (2017.01)
*A01K 61/85* (2017.01)

(52) U.S. Cl.
CPC .............. *A01K 61/95* (2017.01); *A01K 61/85* (2017.01)

(58) Field of Classification Search
CPC ......... G06T 7/0012; G06T 2207/10088; G06T 2207/30096; G16H 50/70; G16H 30/20;
(Continued)

(56) References Cited

U.S. PATENT DOCUMENTS 10,856,520 B1 * 12/2020 Kozachenok .......... A01K 61/80
2021/0360906 A1 * 11/2021 Yao ........................ A01K 61/80

FOREIGN PATENT DOCUMENTS

CN 113040081 A * 6/2021 ........... G06V 10/267

OTHER PUBLICATIONS

Weiqiang Ni; Dan Wei; Zequn Peng; Zhen Ma; Songming Zhu; Rong Tang; Xuelei Tian; Jian Zhao; and Zhangying Ye: "An appetite assessment method for fish in outdoor ponds with anti-shadow disturbance"; Published Apr. 17, 2024; Computer and Electronics in Agriculture 221 (2024) 108940; pp. 1-10. (Year: 2024).*

* cited by examiner

*Primary Examiner* — Siamak Harandi
(74) *Attorney, Agent, or Firm* — Hoffmann & Baron LLP

(57) ABSTRACT

Provided are an intelligent feeding method and system for fish in a recirculating aquaculture system based on repeated games. The method includes: constructing repeated games, determining Nash equilibrium strategies based on the repeated games, determining a payoff relationship between different strategies in a research phase, and quantifying a hunger level and determining a feeding amount based on the payoff relationship as well as an intrinsic connection between hunger levels and energy intake and expenditure in fish group feeding behavior. This application uses a simple and effective repeated game method to determine the feeding amount that promotes cooperative swimming feeding behavior in the fish group, effectively reducing feed waste caused by the existing method of determining the feeding amount based on total fish biomass and farming experience. This application ensures sufficient energy supply for fish growth while promoting cooperative swimming feeding behavior among individual fish in the group.

10 Claims, 3 Drawing Sheets

(58) Field of Classification Search
CPC ........ G16H 30/40; G16H 50/20; A01K 61/95; A01K 61/85; A01K 61/80
See application file for complete search history.

INTELLIGENT FEEDING METHOD AND SYSTEM FOR FISH IN RECIRCULATING AQUACULTURE SYSTEM BASED ON REPEATED GAMES

TECHNICAL FIELD

The present disclosure relates to the field of energy consumption analysis of fish swimming behavior and feeding methods in recirculating aquaculture systems, and in particular, to an intelligent feeding method and system for fish in a recirculating aquaculture system based on repeated games.

BACKGROUND

A recirculating aquaculture system (RAS) is a new farming model that recycles wastewater generated in fish ponds through a series of water treatment units. It can address the issue of low water resource utilization, saving 90%-99% of water resources compared to traditional aquaculture systems, and can provide a stable, comfortable, and high-quality living environment for aquatic organisms, facilitating high-density farming. This system is considered the inevitable trend in the future of fisheries. In a recirculating aquaculture system, besides initial equipment costs, feed constitutes a major part of the farming expenses. In existing feeding methods, the common practice is to feed fish with sufficient feed to ensure normal growth. While this method ensures that fish intake enough energy, it leads to feed residues, increasing unnecessary feed costs and water treatment expenses in the recirculating water system. Additionally, excess food can disrupt the swimming cooperation among individuals in a fish group. From a hydrodynamic perspective, fish swimming in groups in water can save energy consumption of individual fish. However, when food is abundant, individuals in the fish group can compensate for excess energy consumption from additional food sources, leading to some individuals breaking away from group swimming, resulting in unnecessary energy consumption and reducing feed conversion rates, thereby lowering farming profits.

Observations show that hungry fish individuals increase swimming cooperation to reduce unnecessary energy consumption, but after a period of feeding, individuals may start acting independently from the group. This indicates that a certain level of hunger promotes cooperation among fish individuals, and after a certain amount of feeding, individual fish gains the ability to pay for additional swimming energy costs. In this case, the individual may swim alone. To maintain group swimming cooperation and save feed, it is necessary to determine the hunger level. Feeding an appropriate amount of feed each time to keep the fish at a specific hunger level promotes swimming cooperation among the fish group.

In summary, the present disclosure proposes an intelligent feeding method for fish in a recirculating aquaculture system based on repeated games. By dividing a full feed into multiple smaller feedings and establishing a finite repeated game, a suitable hunger level is determined to further calculate a scientific feeding amount based on the hunger level obtained.

SUMMARY

An objective of the present disclosure is to provide an intelligent feeding method and system for fish in a recirculating aquaculture system based on repeated games, offering technical support for feeding in recirculating aquaculture system.

The present disclosure adopts the following technical solutions:

An intelligent feeding method for fish in a recirculating aquaculture system based on repeated games is provided. The method utilizes a relationship between hunger levels of a fish group and feeding swimming strategies. The feeding swimming strategies include a cooperative swimming feeding strategy and a non-cooperative swimming feeding strategy. Based on a repeated game of feeding swimming, a payoff relationship between different strategies in the fish group when non-cooperative swimming feeding occurs in the fish group is determined, a hunger level is quantified based on energy intake and consumption of the fish group, and finally a subsequent feeding amount is determined based on a desired hunger level H and a satiety feeding amount M.

Further, the method is as follows:

in the recirculating aquaculture system, placing a group of farmed fish that have not eaten for more than 24 hours, namely, in a fasting state, where the number of individuals in the fish group is denoted as N, and body sizes of the individuals are relatively uniform; determining the satiety feeding amount M for the fish group and an amount m for each feeding, where M=mT, and T is the number of repeated feedings; if the non-cooperative swimming feeding appears in the fish group during an (n+1)-th feeding, that is, a total payoff of the fish group using the non-cooperative swimming strategy is greater than a total payoff of the cooperative swimming feeding strategy used in previous n+1 feedings, determining that a payoff for a fish individual during the (n+1)-th feeding under the non-cooperative swimming feeding strategy is greater than a payoff under the cooperative swimming feeding strategy.

Furthermore, the payoff is quantified using energy gains from feedings and energy consumption from swimming; based on a payoff relationship between the two different strategies for the fish individual during the (n+1)-th feeding, maximum energy consumption that the fish individual can bear and an ability of the individual fish to pay for additional swimming energy consumption are quantified. An inverse ratio of the maximum energy consumption to the ability to pay for additional swimming energy consumption represents a hunger level, which is then used as the hunger level of the fish group.

Additionally, oxygen consumption required for the fish group to complete one feeding under overall cooperative swimming feeding conditions is measured as $V_{O_2}$, where a conversion factor between the energy consumption and the oxygen consumption is $F_1$. Therefore, consumption for an individual in the fish group to complete a cooperative feeding is:

$$COT = F_1 \times V_{O_2} / N$$

An energy gain GAN obtained is related to the amount of feed consumed by the individual, with a correlation coefficient of $F_2$. Therefore, the energy gain for the individual in the fish group completing a cooperative feeding is:

$$GAN = F_2 \times m/N$$

Then, the payoff for the fish individual under the cooperative swimming feeding strategy during the (n+1)-th feeding is:

$$C = (F_2 * m - F_1 \times V_{O_2})/N$$

When it is detected that individuals using the non-cooperative swimming feeding strategy appear in the fish group during the (n+1)-th feeding process, a feeding amount of any individual during an n-th feeding and a feeding amount during the (n+1)-th feeding are determined using a high-definition camera, thereby determining a feeding gain increase ratio S, which is a ratio of the feeding amount in the (n+1)-th feeding to the feeding amount in the n-th feeding. At this time, the energy gain for the individual completing a non-cooperative feeding is:

$$GAN' = S \times F_2 \times m/N$$

Oxygen consumption of the individual during the (n+1)-th feeding is set to $$V'_{O_2}$$

Then, consumption for the individual completing a non-cooperative feeding is:

$$COT' = F_1 \times V'_{O_2}.$$

Thus, the payoff for the fish individual under the non-cooperative swimming feeding strategy during the (n+1)-th feeding is:

$$D = S \times F_2 \times m/N - F_1 \times V'_{O_2}$$

From the payoff relationship D≥C, it is obtained that:

$$V'_{O_2} \leq \frac{(S-1)F_2 m}{F_1 N} + V_{O_2}/N.$$

Thus, the desired hunger level H for the fish group is:

$$H = 1 - \frac{(S-1)F_2 m}{(S-1)F_2 m + F_1 V_{O_2}}$$

Furthermore, after the desired hunger level H for the fish group is determined, a feeding amount $M_p$ for each subsequent feeding can be determined as follows:

$$M_P = H \times M.$$

An intelligent feeding method for fish in a recirculating aquaculture system based on repeated games includes directly measuring corresponding parameters according to a calculation formula of suitable hunger level H, and then feeding to a satiety feeding amount M according to an amount $M_p$ for each feeding.

An intelligent feeding system for fish in a recirculating aquaculture system based on repeated games includes a recirculating aquaculture system, a high-definition camera, a light-emitting diode (LED) light, a computer, an oxygen consumption detection apparatus, a feeding device, and a programmable logic controller (PLC).

The high-definition camera is installed above the recirculating aquaculture system and is connected to the computer to ensure monitoring of fish behaviors. The LED light is configured to provide supplementary lighting for the high-definition camera, and an output end of the PLC is connected to the feeding device; the computer determines a feeding amount using the foregoing method, and transmits the feeding amount to the PLC.

The principle of the present disclosure is as follows:

Feeding behavior and swimming behavior are fundamental behavioral patterns of fish, relating to energy intake and energy consumption of fish, respectively. Additionally, the hunger level of fish also influences their choice of feeding swimming strategies. When fish are in a fasting state, they cannot afford the additional swimming energy consumption associated with the non-cooperative swimming feeding strategy. However, when the hunger level decreases to a certain range, fish individuals will choose different feeding swimming strategies based on their preferences. By utilizing the intrinsic relationship between hunger levels and feeding swimming strategies, the method defines the repeated game of feeding swimming while quantifying the hunger level based on fish group behavior. Anew feeding method is established by combining the hunger level H with the satiety feeding amount M.

The intelligent feeding method for fish in a recirculating aquaculture system based on repeated games according to the present disclosure fully utilizes behavioral information of the farmed fish to reflect the choices of fish individuals in cooperative swimming and feeding strategies. The method moves away from traditional feeding methods that may lead to feed waste, achieving precise control over feeding amounts in a recirculating aquaculture system. While meeting the energy supply for the growth of the farmed fish, the present disclosure effectively improves the production efficiency of a recirculating aquaculture system.

DETAILED DESCRIPTION OF THE EMBODIMENTS

The following further describes the present disclosure in detail with reference to the accompanying drawings and embodiments.

Figure 1:
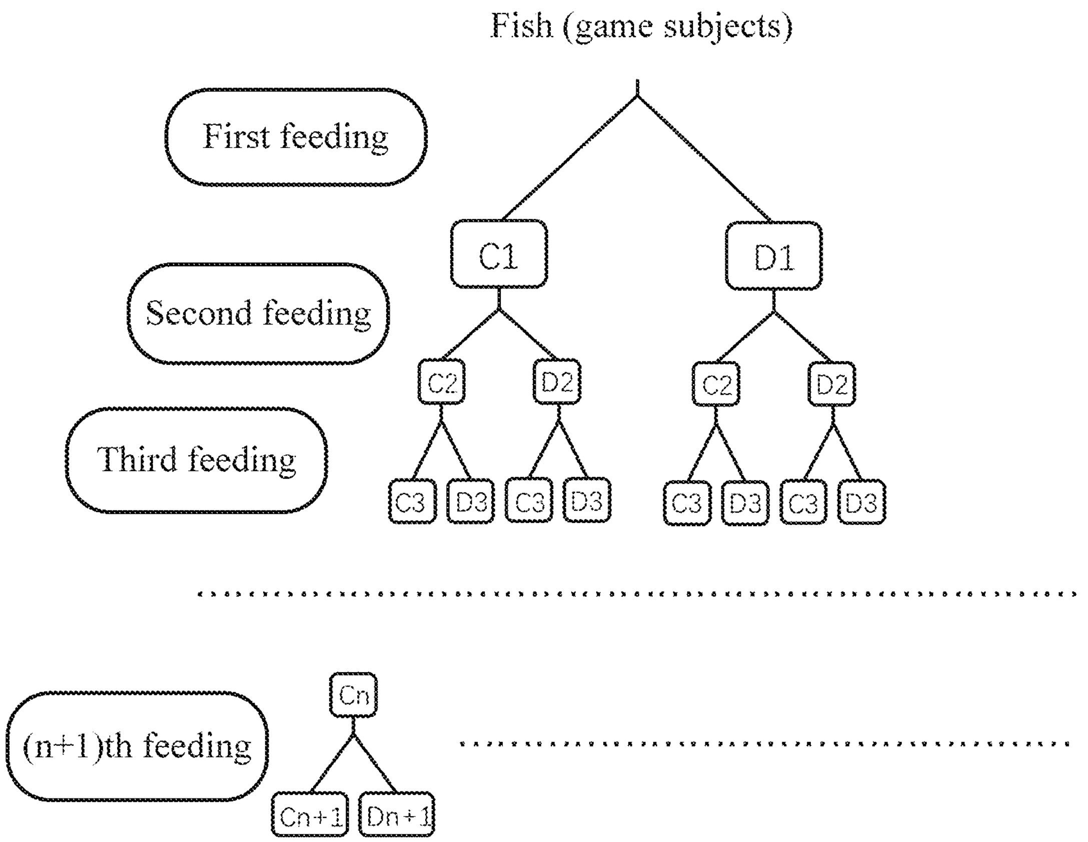
FIG. 1 is a schematic diagram of a finite repeated game based on multiple feedings.
Figure 2:
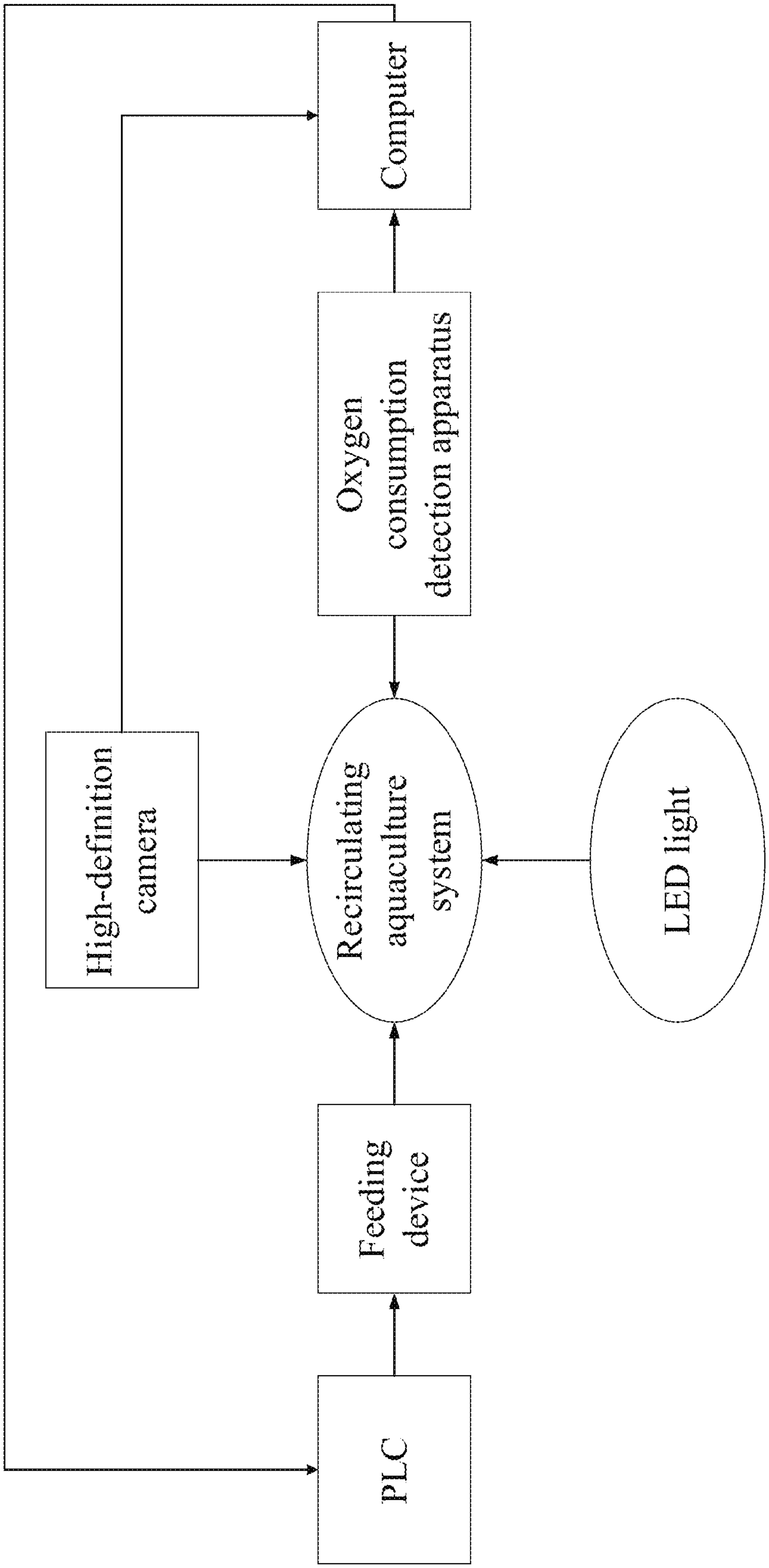
FIG. 2 is a block diagram for an intelligent feeding system for fish in a recirculating aquaculture system based on repeated games.

An embodiment of the present disclosure provides an intelligent feeding system for fish in a recirculating aquaculture system based on repeated games, including a recirculating aquaculture system, a high-definition camera, an LED light, a computer, an oxygen consumption detection apparatus, a feeding device, and a PLC, as shown in FIG. 2.

The high-definition camera is installed above the recirculating aquaculture system and is connected to the computer to ensure monitoring of fish behaviors. The LED light is mounted at a suitable position to provide supplementary lighting for the high-definition camera, and an output end of the PLC is connected to the feeding device.

Specifically, the recirculating aquaculture system is used for temporary rearing of farmed fish that have not eaten for more than 24 h, i.e., in a fasting state, and serves as a main part for realizing the intelligent feeding system; the high-definition camera is used to film the feeding process of the fish group, and to determine the distinguishing point between the cooperative and non-cooperative swimming behaviours of the fish group; the LED light is used to provide supplementary lighting during the filming process, to ensure that the camera can acquire clearer images. The oxygen consumption detection apparatus (e.g., dissolved oxygen sensor) is installed in the recirculating aquaculture system, and used to measure the amount of oxygen consumption required for the fish group to complete a feeding under the condition of overall cooperative swimming feeding; and the feeding device is used to feed the fish group automatically, and the PLC is used to control the feeding amount as well as the feeding interval.

Figure 3:
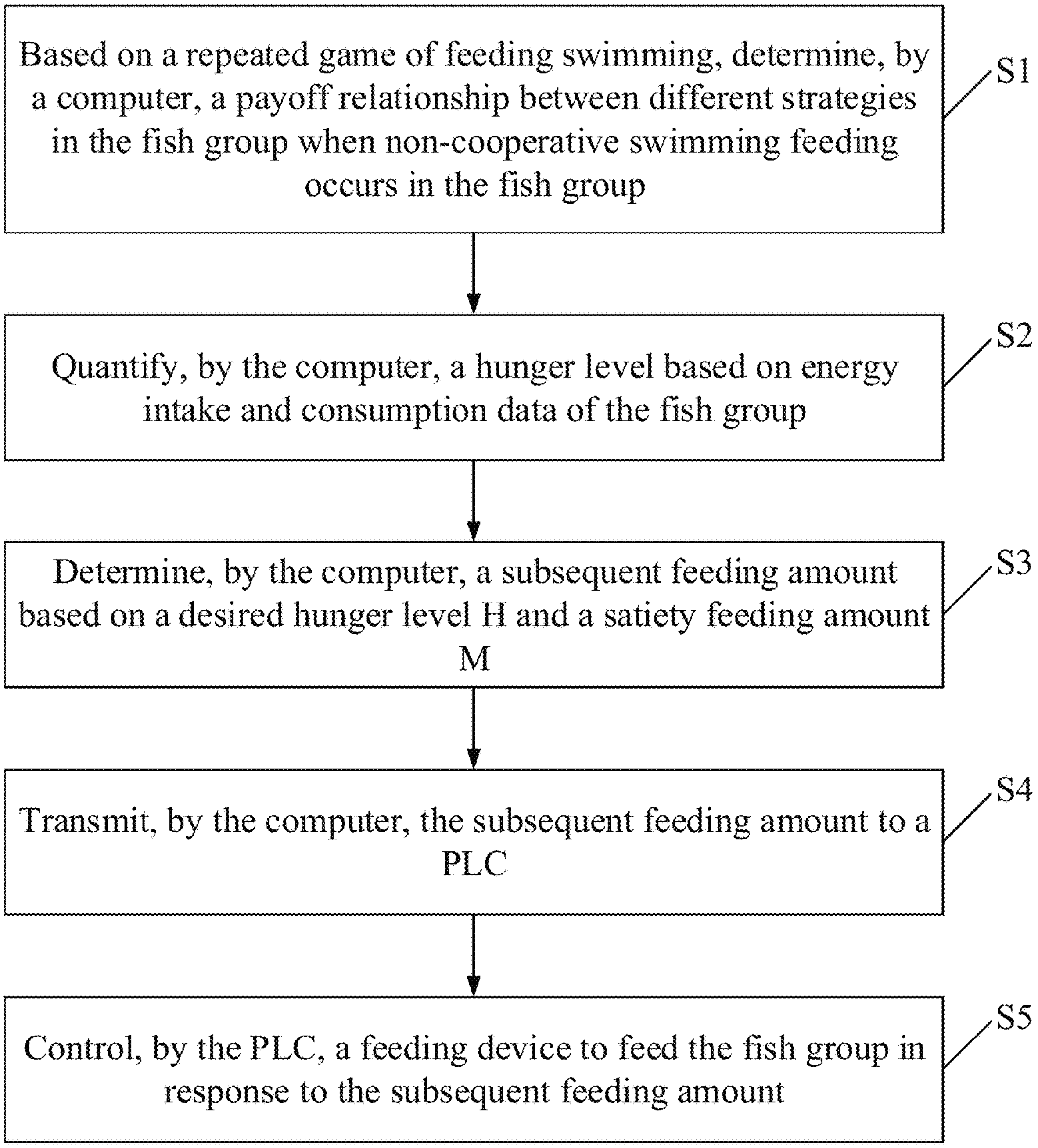
FIG. 3 is a flowchart for an intelligent feeding method for fish in a recirculating aquaculture system based on repeated games.

The system executes an intelligent feeding method for fish in a recirculating aquaculture system based on repeated games, as shown in FIG. 3. The intelligent feeding method is determined by analyzing cooperative swimming conditions of farmed fish and on the basis of a satiety feeding amount by the computer. In one embodiment of the present disclosure, the method specifically includes the following steps:

S1: based on a repeated game of feeding swimming, the computer determines a payoff relationship between different strategies in the fish group when non-cooperative swimming feeding occurs in the fish group.

1) Place a group of farmed fish that have not eaten for more than 24 hours (i.e., in a fasting state) in a recirculating aquaculture system (ensuring a relatively uniform body size of the fish group and the number of individuals N), and ensure that the high-definition camera directly above the recirculating aquaculture system can transmit image information to the computer in real-time.

2) Determine a satiety feeding amount M for the fish group using an existing method, and repeat T feedings, where an amount for each feeding is m (M=mT). Granular floating feed is used during feedings, and there is essentially no time interval required between feedings. The next feeding can begin as soon as the high-definition camera detects that there are no feed residues left in the recirculating aquaculture system after each feeding. This process divides a normal feeding with the feeding amount determined based on experience into T feedings, aimed at determining a payoff relationship between different strategies in the farmed fish group based on a repeated game of feeding swimming, thereby obtaining a desired suitable hunger level H for the fish group. Once H is determined, feedings can be performed more accurately.

3) At this point, fish individuals in the fish group face a predetermined game G of the feeding strategies during each feeding stage. In this game, the subjects (fish) have two feeding strategies to choose from: cooperative swimming feeding and non-cooperative swimming feeding. Cooperative swimming and non-cooperative swimming are two swimming states of the fish group, which are terms commonly used in the field. Cooperative swimming is also known as swarm swimming. In the present disclosure, the feeding behavior and swimming behavior of the fish group are combined and referred to as cooperative swimming feeding and non-cooperative swimming feeding. A payoff for cooperative swimming feeding is denoted as C, while a payoff for non-cooperative swimming feeding is denoted as D. Calculation methods for both payoffs are the same, being a sum of energy gains from feeding and energy consumption for swimming. Since the swimming behavior of the fish group changes during the feeding process, if the entire feeding process is viewed as a single event, it would not be possible to accurately analyze the payoffs. Therefore, in the present disclosure, the theory of repeated game is used to divide the entire feeding process into T feedings, and payoffs should be analyzed from the perspective of the overall repeated game rather than focusing on any single game.

4) Denote the game G repeated T times as G(T), representing the finite repeated game. Through observation with the high-definition camera, it was detected that during an n-th feeding, all fish individuals still used the cooperative swimming feeding strategy. However, during an (n+1)-th feeding, some fish individuals changed the strategy and started using the non-cooperative strategy throughout the entire feeding stage ($n<n+1\leq T$).

5) At this point, define two other repeated games: G(n) and G(n+1). R is used to represent a total payoff of the repeated games. In an n-th stage, if a cooperative strategy is adopted, the payoff is denoted as $C_n$. If a non-cooperative strategy is used, the payoff is denoted as $D_n$. Therefore, a Nash equilibrium strategy payoff of the repeated game G(n) is calculated as follows:

$$R_n = \sum_{n=1}^{n} \delta^{n-1} C_n$$

δ represents a discount factor. In game theory, the discount factor can be considered as the level of patience of participants, with values ranging from 0 to 1. A higher value indicates better patience, while a value of 0 indicates that a participant has no patience. In this study, the feeding amount and feeding time per round are controlled to stabilize the discount factor, avoiding affecting the subsequent process.

6) For another repeated game G (n+1), there are two total payoffs:

$$R_{n+1} = \sum_{n=1}^{n} \delta^{n-1} C_n + \delta^n D_{n+1}$$

$$R'_{n+1} = \sum_{n=1}^{n} \delta^{n-1} C_n + \delta^n C_{n+1}$$

Based on the observed fish behavior, it is found that $$R_{n+1} \geq R'_{n+1},$$

that is, $D_{n+1}\geq C_{n+1}$.

S2: a hunger level is quantified by the computer based on energy intake and consumption data of the fish group, where the energy intake of the fish group is determined by a high-definition camera, and the energy consumption of the fish group is determined by an oxygen consumption detection apparatus.

7) The oxygen consumption detection apparatus measures oxygen consumption required for the fish group to complete a feeding stage under cooperative swimming feeding conditions, where the oxygen consumption is denoted as $V_{O_2}$, and a conversion factor between energy consumption and oxygen consumption is $F_1$. Therefore, energy consumption for an individual in the fish group to complete a cooperative feeding is calculated as follows:

$$COT = F_1 \times V_{O_2}/N$$

An energy gain GAN obtained is related to the amount of feed consumed by the individual, with a correlation coefficient set to $F_2$. Therefore, the energy gain for the individual in the fish group completing a cooperative feeding is:

$$GAN = F_2 \times m/N$$

$$C = (F_2 * m - F_1 \times V_{O_2})/N$$

8) When it is detected that an individual using the non-cooperative swimming feeding strategy appears in the fish group during the (n+1)-th feeding process, determine a feeding amount of the individual during an n-th feeding and a feeding amount during the (n+1)-th feeding using a high-definition camera, thereby determining a feeding gain increase ratio S (which is a ratio of the feeding amount in the (n+1)-th feeding to the feeding amount in the n-th feeding). At this time, the energy gain for the individual completing a non-cooperative feeding is:

$$GAN' = S \times F_2 \times m/N$$

In the foregoing process, multiple individuals using the non-cooperative swimming feeding strategy may appear simultaneously. This study considers individual behavior as a commonality extended to the group, and only needs to focus on any one of the individuals.

When some individuals in the fish group exhibit non-cooperative swimming feeding, the swimming routes of other individuals may also be affected, leading to increased oxygen consumption. As the oxygen consumption of non-cooperative swimming individuals cannot be accurately measured based on the total oxygen consumption of the fish group, the oxygen consumption of a non-cooperative feeding individual during the (n+1)-th feeding is denoted as $$V'_{O_2}.$$

Therefore, the energy consumption for the individual to complete a non-cooperative feeding is:

$$COT' = F_1 \times V'_{O_2}$$

$$D = S \times F_2 \times m/N - F_1 \times V'_{O_2}$$

9) Combine quantified intake and consumption payoffs of the fish group from 7) and 8) with the payoff relationship determined in 6), where through derivation, it is obtained that:

$$V'_{O_2} \leq \frac{(S-1)F_2 m}{F_1 N} + V_{O_2}/N$$

Maximum energy consumption that an individual can bear is determined by a hunger level H of the current feeding stage. The hunger level H ranges from 0 to 1, with a higher value indicating greater hunger. When H is equal to 1, it indicates that the fish is in a fasting state; when H is equal to 0, it indicates that the fish is in a satiety state. As the hunger level (H) decreases, the energy that fish individuals can expend while swimming increases. The determined maximum oxygen consumption of the individual during non-cooperative swimming feeding minus the consumption $V_{O_2}/N$ for cooperative swimming feeding is the maximum additional expenditure. A ratio of the fish individual's ability to pay for the additional swimming energy expenditure to the maximum energy consumption that the fish individual can bear is determined as the hunger level of the fish individual. In this case, the hunger level of the individual is extrapolated to the group, which indicates the desired suitable hunger level H for the fish group, expressed as:

$$H = 1 - \frac{(S-1)F_2 m}{(S-1)F_2 m + F_1 V_{O_2}}$$

10) During the n-th feeding, all fish individuals still adopt the cooperative swimming feeding strategy; during the (n+1)-th feeding, some fish individuals change the strategy and begin to use the non-cooperative strategy. During the n-th feeding, the hunger level of the fish group can be roughly described as:

$$H'_n = 1 - \frac{nm}{M}$$

During the (n+1)-th feeding, the hunger level of the fish group can be roughly described as:

$$H'_{n+1} = 1 - \frac{(n+1)m}{M}$$

According to the research approach of the present disclosure, it can be determined that during the current feeding stage, a total feed amount of nm has been given, and a feed amount of (n+1)m is currently being provided. Therefore, when non-cooperative swimming feeding behavior occurs, the feeding amount is greater than or equal to nm and less than or equal to (n+1)m. Thus, the hunger level of the subjects under study during the corresponding research period lies between nm and (n+1)m, that is:

$$1 - \frac{(n+1)m}{M} \leq H \leq 1 - \frac{nm}{M}$$

S3: the computer determines a subsequent feeding amount based on the desired hunger level H and the satiety feeding amount M.

Using this method, the accuracy of using the hunger level H as the desired suitable hunger level for the fish group is further verified. The subsequent feeding method can be determined based on the hunger level H and the satiety feeding amount M. The specific feeding amount $M_F$ can be expressed as:

$$M_P = \left(1 - \frac{(s-1)F_2 m}{(S-1)F_2 m + F_1 V_{O_2}}\right) \times M$$

For the same batch of farmed fish, all parameters can be measured according to the formula for the suitable hunger level H established in the present disclosure, thereby determining H at once. Each subsequent feeding will then follow the amount Mp until the satiety feeding amount is reached. In the process of determining H:

S represents an amount of food consumed by the individual subject during the (n+1)-th feeding when non-cooperative swimming feeding occurs, divided by the average food intake from each of the previous n feedings.

$F_1$ represents a conversion relationship between oxygen consumption and energy consumption, which is related to the flow rate in the recirculating water system, the species of fish, the weight of the fish, and the temperature, and can be calculated and measured using existing methods.

$F_2$ represents a relationship between the amount of feed intake and energy absorption, which is related to the composition of the feed and the absorption capacity of the fish, and can be measured using existing methods.

S4: the computer then transmits the subsequent feeding amount to the PLC.

S5: the PLC controls the feeding device to feed the fish group in response to the subsequent feeding amount.

Disclosed above are merely specific embodiments of the present disclosure, but the present disclosure is not limited thereto. For those of ordinary skill in the art, modifications made without departing from the present disclosure shall be regarded as falling within the protection scope of the present disclosure.

What is claimed is:

1. An intelligent feeding method for fish in a recirculating aquaculture system based on repeated games, wherein the intelligent feeding method utilizes a relationship between hunger levels of a fish group and feeding swimming strategies; the feeding swimming strategies comprise a cooperative swimming feeding strategy and a non-cooperative swimming feeding strategy;

wherein the intelligent feeding method comprises:

based on a repeated game of feeding swimming, determining, by a computer, a payoff relationship between different strategies in the fish group when non-cooperative swimming feeding occurs in the fish group, quantifying, by the computer, a hunger level based on energy intake and consumption of the fish group, wherein the energy intake of the fish group is determined by a high-definition camera, and the energy consumption of the fish group is determined by an oxygen consumption detection apparatus, determining, by the computer, a subsequent feeding amount based on a desired hunger level H and a satiety feeding amount M, transmitting, by the computer, the subsequent feeding amount to a programmable logic controller (PLC), and controlling, by the PLC, a feeding device to feed the fish group in response to the subsequent feeding amount.

2. The intelligent feeding method for fish in the recirculating aquaculture system based on the repeated games according to claim 1, wherein based on the repeated game of feeding swimming, determining the payoff relationship between different strategies in the fish group when non-cooperative swimming feeding occurs in the fish group comprises:

in the recirculating aquaculture system, placing a group of farmed fish that have not eaten for more than 24 hours, where a number of individuals in the fish group is denoted as N, and body sizes of the individuals are relatively uniform;

determining the satiety feeding amount M for the fish group and an amount m for each feeding, wherein M=mT, and T is a number of repeated feedings; when the non-cooperative swimming feeding appears in the fish group during an (n+1)-th feeding, which indicates that a total payoff of the fish group using the non-cooperative swimming strategy is greater than a total payoff of the cooperative swimming feeding strategy used in previous n+1 feedings, determining that a payoff for a fish individual during the (n+1)-th feeding under the non-cooperative swimming feeding strategy is greater than a payoff under the cooperative swimming feeding strategy.

3. The intelligent feeding method for fish in the recirculating aquaculture system based on the repeated games according to claim 2, wherein quantifying the hunger level based on energy intake and consumption of the fish group comprises:

quantifying the payoff by using energy gains from feedings and energy consumption from swimming;

based on a payoff relationship between the two different strategies for the fish individual during the (n+1)-th feeding, quantifying maximum energy consumption that the fish individual is able to bear and an ability of the individual fish to pay for additional swimming energy consumption; and subtracting an inverse ratio of the maximum energy consumption to the ability to pay for additional swimming energy consumption from 1 to obtain the hunger level of the fish group.

4. The intelligent feeding method for fish in the recirculating aquaculture system based on the repeated games according to claim 3, wherein the oxygen consumption detection apparatus measures oxygen consumption required for the fish group to complete one feeding under overall cooperative swimming feeding conditions as $V_{O_2}$; a conversion factor between the energy consumption and the oxygen consumption is $F_1$; then, consumption for an individual in the fish group to complete a cooperative feeding is:

$$COT = F_1 \times V_{O_2}/N$$

an energy gain GAN obtained is related to the amount of feed consumed by the individual, with a correlation coefficient of $F_2$; then, the energy gain for the individual in the fish group completing a cooperative feeding is:

$$GAN = F_2 \times m/N$$

then, the payoff for the fish individual under the cooperative swimming feeding strategy during the (n+1)-th feeding is:

$$C = (F_2 * m - F_1 \times V_{O_2})/N$$

when it is detected that individuals using the non-cooperative swimming feeding strategy appear in the fish group during the (n+1)-th feeding process, a feeding amount of any individual during an n-th feeding and a feeding amount during the (n+1)-th feeding are determined using the high-definition camera, thereby determining a feeding gain increase ratio S, which is a ratio of the feeding amount in the (n+1)-th feeding to the feeding amount in the n-th feeding; then, the energy gain for the individual completing a non-cooperative feeding is:

$$GAN' = S \times F_2 \times m/N$$

oxygen consumption of the individual during the (n+1)-th feeding is set to $$V'_{O_2};$$

then, consumption for the individual completing a non-cooperative feeding is:

$$COT' = F_1 \times V'_{O_2}$$

therefore, the payoff for the fish individual under the non-cooperative swimming feeding strategy during the (n+1)-th feeding is:

$$D = S \times F_2 \times m/N - F_1 \times V'_{O_2}$$

from the payoff relationship D≥C, it is obtained that:

$$V'_{O_2} \leq \frac{(S-1)F_2 m}{F_1 N} + V_{O_2}/N;$$

the desired hunger level H for the fish group is:

$$H = 1 - \frac{(S-1)F_2 m}{(S-1)F_2 m + F_1 V_{O_2}}.$$

5. The intelligent feeding method for fish in the recirculating aquaculture system based on the repeated games according to claim 1, wherein after the desired hunger level H for the fish group is determined, a feeding amount $M_P$ for each subsequent feeding is determined as follows:

$$M_P = H \times M.$$

6. An intelligent feeding system for fish in a recirculating aquaculture system based on repeated games, comprising:

a recirculating aquaculture system, a high-definition camera, a light-emitting diode (LED) light, a computer, an oxygen consumption detection apparatus, a feeding device, and a programmable logic controller (PLC);

wherein the high-definition camera is installed above the recirculating aquaculture system and is connected to the computer to ensure monitoring of fish behaviors; the LED light is configured to provide supplementary lighting for the high-definition camera, and an output end of the PLC is connected to the feeding device; the computer determines a feeding amount using the method according to claim 1, and transmits the feeding amount to the PLC.

7. The intelligent feeding system according to claim 6, comprising:

in the recirculating aquaculture system, placing a group of farmed fish that have not eaten for more than 24 hours, where a number of individuals in the fish group is denoted as N, and body sizes of the individuals are relatively uniform; determining the satiety feeding amount M for the fish group and an amount m for each feeding, wherein M=mT, and T is a number of repeated feedings; when the non-cooperative swimming feeding appears in the fish group during an (n+1)-th feeding, which indicates that a total payoff of the fish group using the non-cooperative swimming strategy is greater than a total payoff of the cooperative swimming feeding strategy used in previous n+1 feedings, determining that a payoff for a fish individual during the (n+1)-th feeding under the non-cooperative swimming feeding strategy is greater than a payoff under the cooperative swimming feeding strategy.

8. The intelligent feeding system according to claim 7, wherein the payoff is quantified using energy gains from feedings and energy consumption from swimming;

based on a payoff relationship between the two different strategies for the fish individual during the (n+1)-th feeding, maximum energy consumption that the fish individual is able to bear and an ability of the individual fish to pay for additional swimming energy consumption are quantified; an inverse ratio of the maximum energy consumption to the ability to pay for additional swimming energy consumption is subtracted from 1 to be used as the hunger level of the fish group.

9. The intelligent feeding system according to claim 8, wherein the oxygen consumption detection apparatus measures oxygen consumption required for the fish group to complete one feeding under overall cooperative swimming feeding conditions as $V_{O_2}$; a conversion factor between the energy consumption and the oxygen consumption is $F_1$;

then, consumption for an individual in the fish group to complete a cooperative feeding is:

$$COT = F_1 \times V_{O_2}/N$$

an energy gain GAN obtained is related to the amount of feed consumed by the individual, with a correlation coefficient of $F_2$; then, the energy gain for the individual in the fish group completing a cooperative feeding is:

$$GAN = F_2 \times m/N$$

then, the payoff for the fish individual under the cooperative swimming feeding strategy during the (n+1)-th feeding is:

$$C=(F_2*m-F_1\times V_{O_2})/N$$

when it is detected that individuals using the non-cooperative swimming feeding strategy appear in the fish group during the (n+1)-th feeding process, a feeding amount of any individual during an n-th feeding and a feeding amount during the (n+1)-th feeding are determined using a high-definition camera, thereby determining a feeding gain increase ratio S, which is a ratio of the feeding amount in the (n+1)-th feeding to the feeding amount in the n-th feeding; then, the energy gain for the individual completing a non-cooperative feeding is:

$$GAN'=S\times F_2\times m/N$$

oxygen consumption of the individual during the (n+1)-the feeding is set to $$V'_{O_2};$$

then, consumption for the individual completing a non-cooperative feeding is:

$$COT'=F_1\times V'_{O_2}$$

therefore, the payoff for the fish individual under the non-cooperative swimming feeding strategy during the (n+1)-th feeding is:

$$D=S\times F_2\times m/N-F_1\times V'_{O_2}$$

from the payoff relationship D≥C, it is obtained that:

$$V'_{O_2}\le\frac{(S-1)F_2m}{F_1N}+V_{O_2}/N;$$

the desired hunger level H for the fish group is:

$$H=1-\frac{(s-1)F_2m}{(s-1)F_2m+F_1V_{O_2}}.$$

10. The intelligent feeding system according to claim 6, wherein after the desired hunger level H for the fish group is determined, a feeding amount $M_P$ for each subsequent feeding is determined as follows:

$$M_P=H\times M.$$

* * * * *